United States Patent
Missoni

(10) Patent No.: US 7,119,610 B2
(45) Date of Patent: Oct. 10, 2006

(54) CIRCUIT ARRANGEMENT

(75) Inventor: Albert Missoni, Graz (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/104,293

(22) Filed: Apr. 11, 2005

(65) Prior Publication Data

US 2005/0219110 A1    Oct. 6, 2005

Related U.S. Application Data

(63) Continuation of application No. PCT/DE03/03148, filed on Sep. 22, 2003.

(30) Foreign Application Priority Data

Oct. 10, 2002  (DE) ............................... 102 47 306
Dec. 9, 2002   (DE) ............................... 102 57 442

(51) Int. Cl.
   *H03M 1/50*    (2006.01)

(52) U.S. Cl. ..................................... 329/311; 341/166

(58) Field of Classification Search ................ 329/311; 341/166
See application file for complete search history.

(56) References Cited

U.S. PATENT DOCUMENTS 3,786,360 A  *  1/1974   Kawa .......................... 329/311
6,069,499 A     5/2000   Cho et al.
6,768,373 B1 *  7/2004   Kupnik et al. .............. 329/311

FOREIGN PATENT DOCUMENTS

DE    199 09 086 C2    9/2000
DE    101 16 747 A1   10/2002

* cited by examiner

*Primary Examiner*—Joseph Chang
(74) *Attorney, Agent, or Firm*—Dickstein Shapiro LLP

(57) ABSTRACT

Circuit arrangement for demodulating a voltage which is ASK modulated by alternating the amplitude between a low and a high level. Respective charging voltages are produced on first and second charging circuits, with a decoupling device decoupling the first charging circuit at a prescribed ratio between the charging voltage from the second charging circuit and an input voltage for a rectifier circuit.

19 Claims, 5 Drawing Sheets

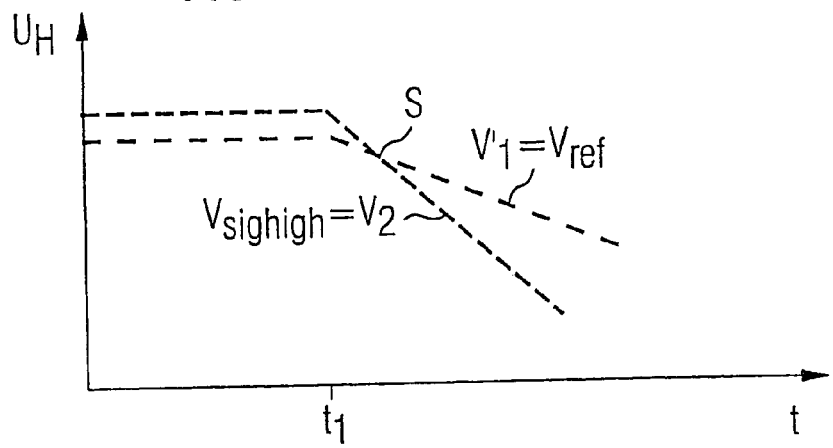
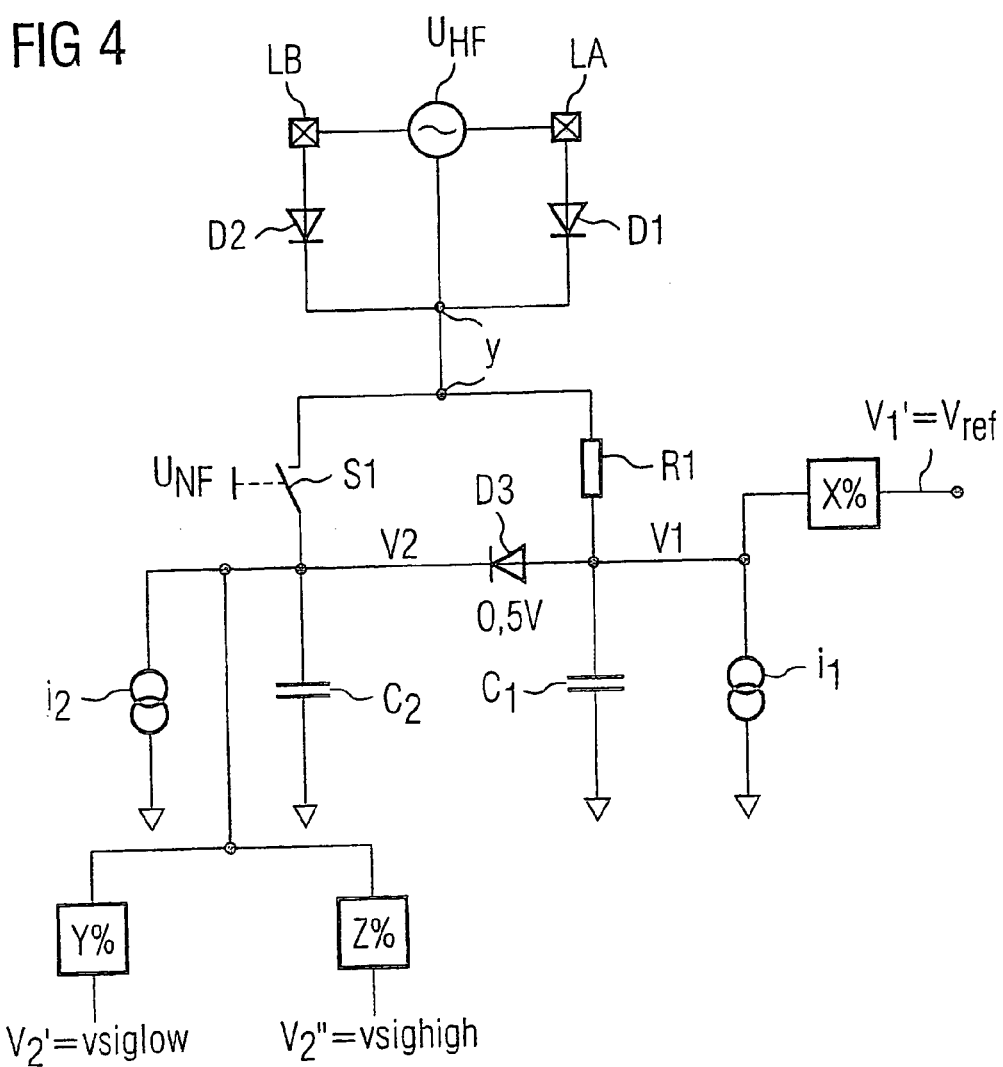

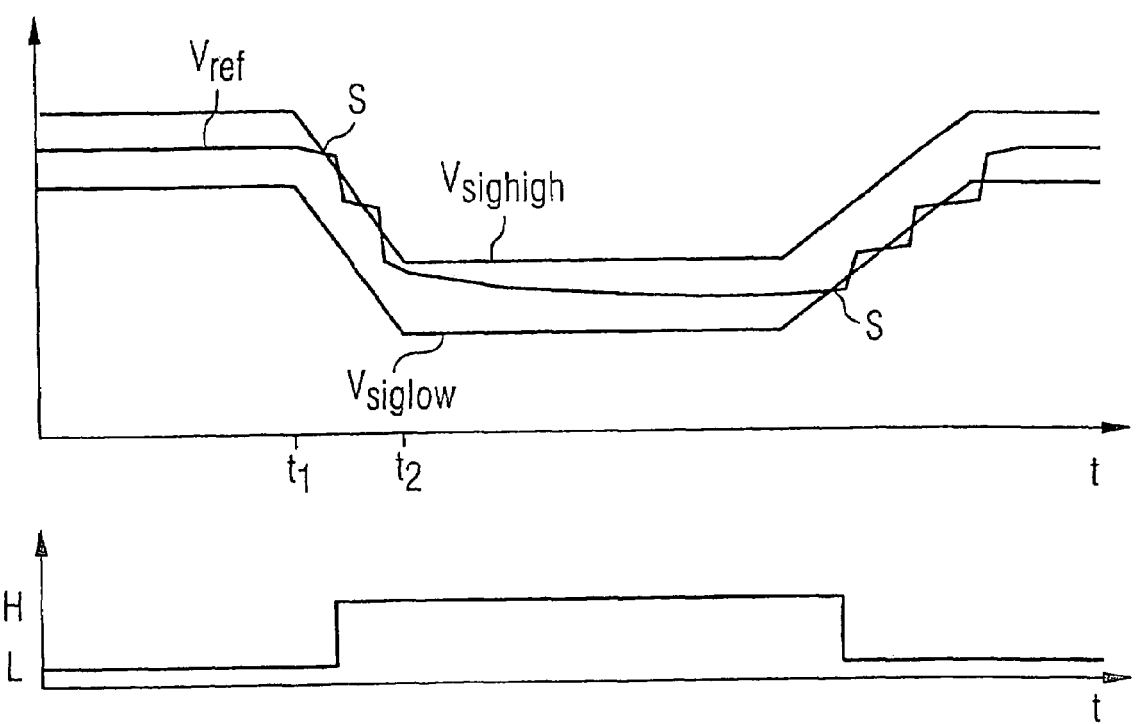

CIRCUIT ARRANGEMENT

CROSS-REFERENCE TO RELATED APPLICATION

This application is a continuation of International Patent Application Serial No. PCT/DE2003/003148, filed Sep. 22, 2003, which published in German on Apr. 29, 2004 as WO 2004/036860, and is incorporated herein by reference in its entirety.

FIELD OF THE INVENTION

The invention relates to a circuit arrangement for analog/digital conversion of a voltage which is (ASK) modulated by alternating the amplitudes between a low and a high level.

BACKGROUND OF THE INVENTION

When using contactless chip cards and the like, such as "contactless tags", use is frequently made of "ASK modulation". This is understood to be a radio-frequency signal which alternates between a first and a second level with data available in digital form and thus modulates the radio-frequency signal.

In the same way as a distinction is made for digital data between "Yes" and "No" or "1" or "0" or "high" and "low", a distinction is made between a high amplitude and a low amplitude. In this context, the two modulation types ASK 100 and ASK 10 are usual at the moment, where ASK 100 signifies a level difference of 100% and ASK 10 signifies a level difference of 10%. Other differences are also possible, however, and the invention described below is not restricted to these two usual modulation types.

The problem of ASK modulation can be seen in that a change in the distance between the transmitter and the receiver of the signal modulated in this manner while the amplitude of the transmitted signal remains the same also results in a change in the received amplitude at the receiver end when the distance is altered. The same applies if differences arise in the interspace between the transmitter and the receiver.

As a further complication, when using signals which always return to "0", i.e. the signal returns to "0" between two binary "1 ", and signals which have no provision for this, "0" and "1" sequences of different lengths are modulated and transmitted.

SUMMARY OF THE INVENTION

The invention is thus based on an object of providing an analog/digital converter circuit which safely identifies the level change between two states in the case of ASK modulations with as little involvement as possible.

The inventive circuit has the advantage that the change in the modulation level can easily be identified when the two charging voltages are compared.

BRIEF DESCRIPTION OF THE DRAWINGS

The invention is explained in detail below with reference to the drawing, in which:

FIG. 3 shows an exemplary profile for the first and second charging voltages;

FIG. 4 shows a second inventive exemplary embodiment;

FIG. 8 shows an exemplary profile for the voltages applied to the evaluation circuit, where the first charging voltage is produced with an altered charging and/or discharge time.

DETAILED DESCRIPTION OF PREFERRED EMBODIMENTS OF THE INVENTION

Figure 1:
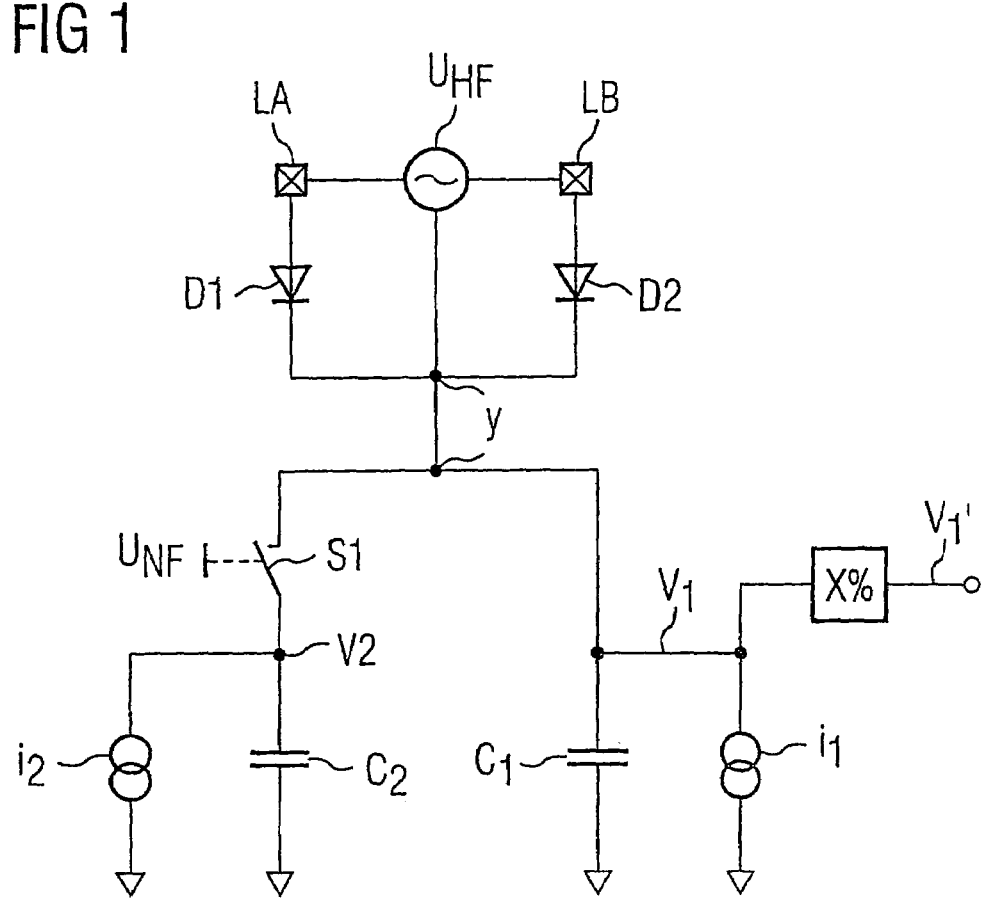
FIG. 1 shows a first exemplary embodiment of the inventive circuit arrangement.
Figure 2:
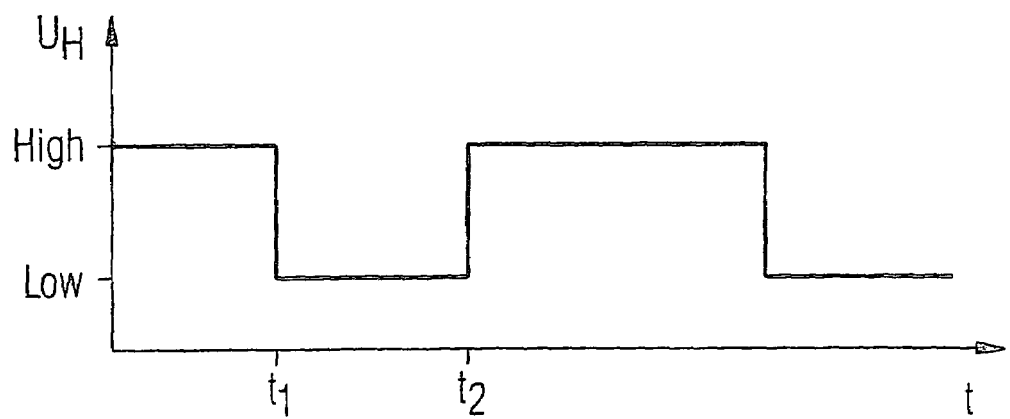
FIG. 2 shows the envelope of an ASK modulated signal.

In the case of the first inventive exemplary embodiment shown in FIG. 1, a radio-frequency input voltage UHF is applied to the input of the demodulator circuit, denoted by the two input connections LA and LB. FIG. 2 shows the envelope of the absolute amplitude value of the radio-frequency input voltage over time. As can be seen, it alternates between a high amplitude level, denoted by "high", and a low amplitude level, denoted by "low". This rectified radio-frequency input voltage UHF is thus present on the node Y in rectified form. The node Y has two charging circuits connected to it in parallel which are charged by the rectified radio-frequency voltage.

The first charging circuit comprises the capacitor C1 and a current source i1, which are again connected in parallel starting from the voltage node V1. Correspondingly, the second charging circuit is made up of the capacitor C2 and the current source i2, which are connected in parallel starting from the voltage node V2. The second charging circuit is connected to the node Y via a charging switch S1. This switch S1 is operated with the low-frequency voltage UNF used to modulate the radio-frequency AC voltage UHF. In the simplest way, this is possible using a diode (not shown).

The way in which this circuit works is explained below. While the rectified radio-frequency voltage UHF on the node Y is higher than the voltage on the input nodes V1 and V2 of the charging circuits and the switch S1 is closed, the capacitors C1 and C2 are charged to the value of the rectified radio-frequency AC voltage UHF. At the same time, the capacitors C1 and C2 are discharged by the current sources i1 and i2, with the time constant of the two charging circuits needing to be chosen such that it is high with respect to the half-period of the radio-frequency input voltage. UHF so that the two input nodes V1 and V2 of the charging circuits do not experience any significant voltage fluctuations (hum) which are caused by the zero crossings of the radio-frequency AC voltage.

As FIG. 2 shows, the amplitude of the radio-frequency input voltage UHF is now intended to be at the "high" level up to the time before t1. At the time t1, it changes over to the "low" level. This change causes the switch S1 to open and results in the second charging circuit and hence the input node V2 being decoupled from the rest of the circuit. If the time constants of the first and second charging circuits have been chosen differently, the result is that the two capacitors C1 and C2 are discharged differently. This is possible, by way of example, by virtue of the two capacitors C1 and C2 being of the same size but the current sources i1 and i2 having different levels. The resultant discharge behavior is shown in FIG. 3.

As can be seen from FIG. 3, the voltage on the node V2 falls distinctly more steeply than the voltage on the node V1. As can be seen in FIG. 1, the voltage V1 has again been converted by means of a voltage divider X% to a voltage at V1'. The result, as can be seen in FIG. 3, is thus an intersection between the discharge curves V2 and V1'. The point of intersection S is now suitable for marking the transition from the "high" level to the "low" level. An evaluation circuit, which will be described later, can be used to detect such a point of intersection.

FIG. 4 shows a further embodiment of the inventive circuit. In this context, reference will first be made to the two voltage dividers Y% and Z% which convert the voltage on the node V2 into two different voltages V2', also referred to as "V siglow", and V2", also referred to as "V sighigh".

The way in which the circuit shown in FIG. 4 works is fundamentally the same as that of the circuit described in FIG. 1. In this case the time constant of the second charging circuit needs to be much lower than that of the first charging circuit, i.e. the current source i2 discharges the capacitor C2 distinctly more quickly than the current source i1 on the capacitor C1. This can be seen clearly in FIG. 6. The signals V sighigh and V siglow thus follow the level change in the radio-frequency input voltage from "high" to "low" fairly accurately. As also described in FIG. 3 with reference to FIG. 1, the point of intersection S arises between the signal V ref and a signal which corresponds to the voltage signal V sighigh.

As soon as the voltage on the voltage node V2 has fallen, as a result of the discharging by the current source i2, to such a level that the voltage is below the radio-frequency input voltage UHF, the switch S1 closes again. This means that the current source i2 now additionally discharges the capacitor C1 via the resistor R1. This can be identified from the fact that the discharge profile Vref in FIG. 6 becomes steeper from the time t2 onward. If there is now a level change in the radio-frequency voltage UHF from "low"0 to "high", the charging circuits' capacitors C1 and C2 are charged again.

The diode D3 ensures that between V1 and V2 there is respectively just a voltage difference corresponding to the voltage drop across this diode D3. Hence, the voltage on the two node points is carried in parallel even for large modulation swings, such as ASK 100, where the amplitude of the radio-frequency input voltage comes close to 0 volts at the "low" level. In this way, it is ensured even for these high modulation jumps that it is always possible to ascertain a perfect point of intersection between V sighigh and V ref.

Figure 5:
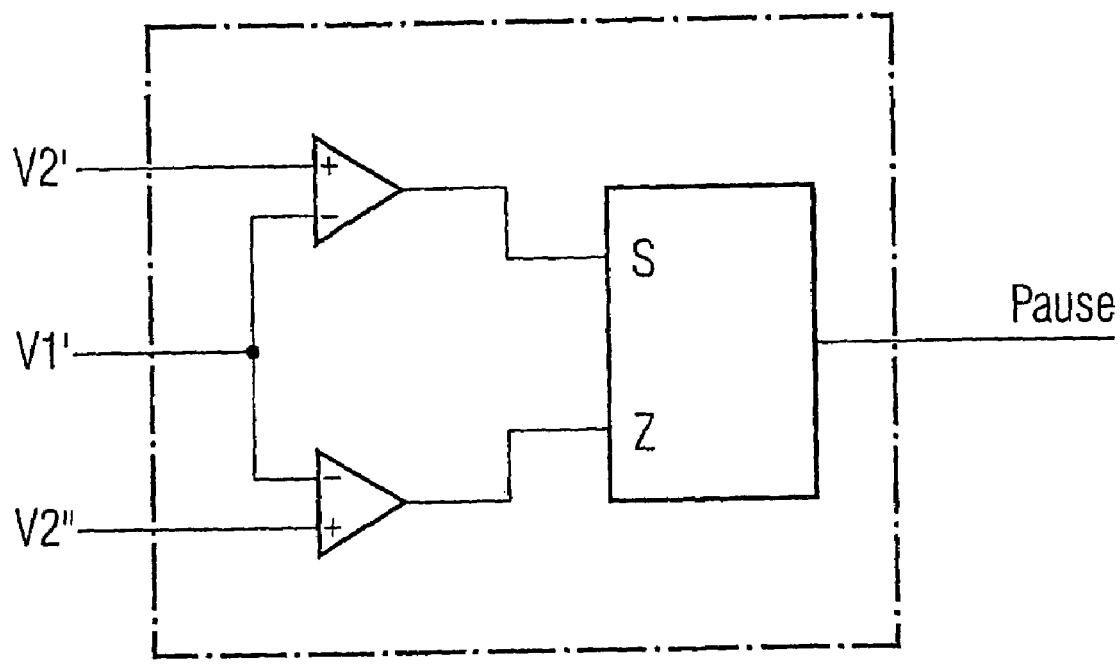
FIG. 5 shows an example of an evaluation circuit.

FIG. 5 shows one possible evaluation circuit for the signals V ref corresponding to V1', V2' corresponding to V sighigh, and V2" corresponding to V siglow. In this context, V1' is respectively applied to the negative input of two differential amplifiers, and V sighigh and V siglow are respectively applied to the positive input. The outputs of the differential amplifiers in turn are connected to an RS flipflop, as shown. The output of the RS flipflop then outputs a signal corresponding to a "high" level or to a "low" level. Other evaluation circuits are also conceivable, however.

Figure 6:
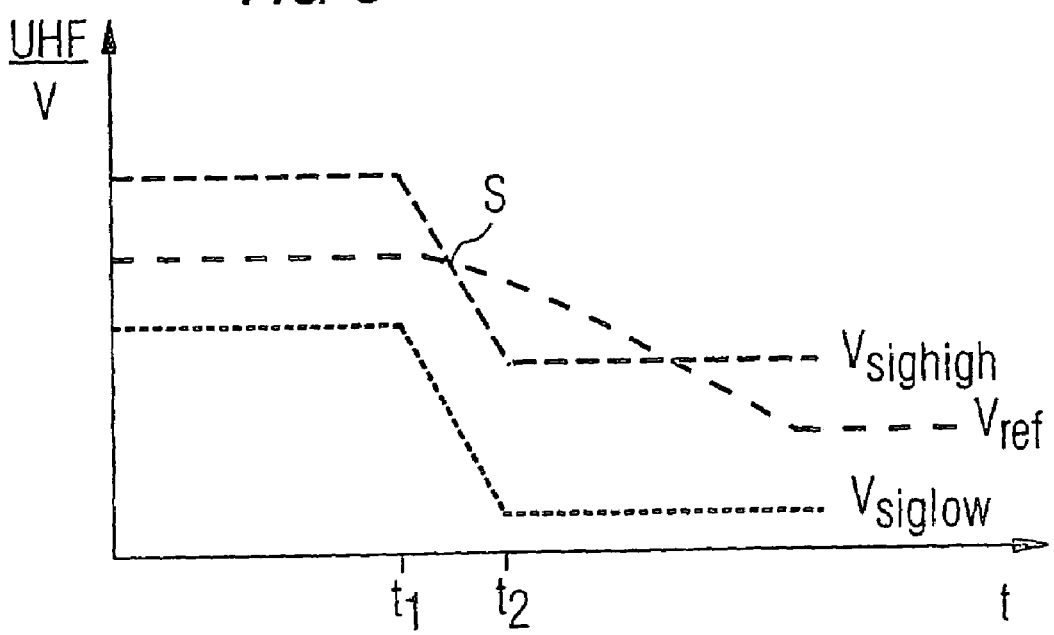
FIG. 6 shows an exemplary profile for the voltages applied to the evaluation circuit.

FIG. 6 shows one possible signal profile, with the amplitude change in the incoming RF signal from "high" to "low" at the time t1 prompting the first and second charging circuit to be discharged, and hence the voltage profile shown being obtained for $V_{sighigh}$, $V_{siglow}$ and $V_{ref}$. The relatively long discharge time for the first charging circuit as compared with the second charging circuit results in the point of intersection S. This point of intersection is identified, by way of example, by the evaluation circuit shown in FIG. 5.

Figure 7:
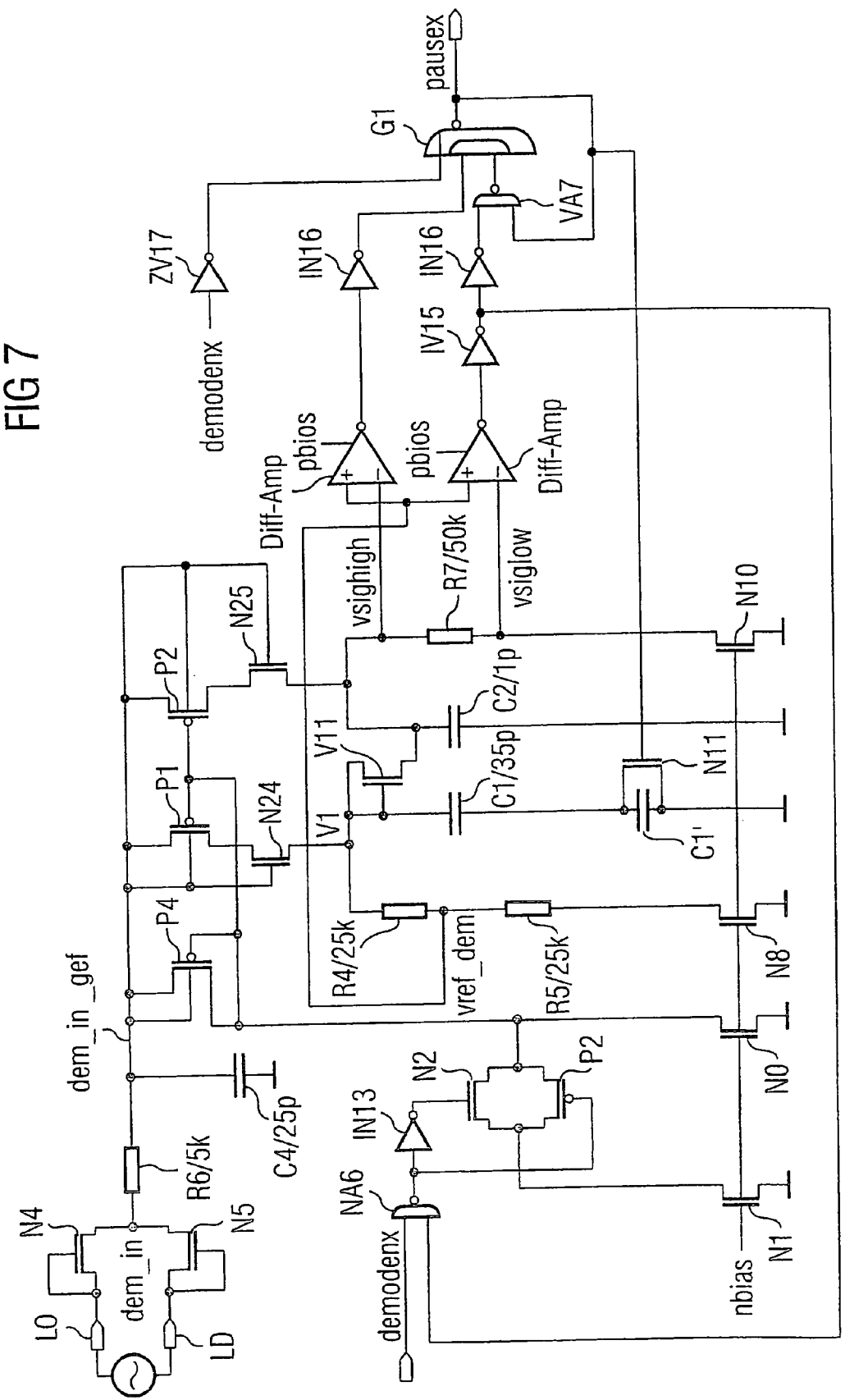
FIG. 7 shows a circuit design for an implementation of the invention.

FIG. 7 shows the circuitry for the implementation of the invention using ordinary CMOS technology. In this context, the input AC voltage is also applied to the input connections LA and LB. The diodes D1 to D2 in the preceding exemplary embodiments are formed accordingly using transistors N4 and N5 in this technology.

Following the rectifier circuit there is a low pass input filter for suppressing the carrier frequency.

In contrast to the charging circuit in the preceding exemplary embodiments, a floating current mirror circuit comprising the p-channel transistors P1 and P2 is provided. This current mirror circuit charges the capacitors C1 and C2, to which the current sinks comprising the n-channel transistors N8 and N10 are connected. The ratio of the charging current delivered by the current mirror circuit to the discharge current determines the respective charging time constants of the capacitors C1 and C2. The resistors R4, R5 and R7 produce the voltage dividers already explained in connection with the preceding exemplary embodiments, which voltage dividers deliver the signals vref_dem, vsighigh and vsiglow which are supplied to the window circuit.

The diodes N24 and N25 decouple the voltages V1 and V2 as soon as the input voltage falls below the voltage level of V1 or V2.

The diode V11 has the same function as the diode D3 explained above.

In addition to the preceding exemplary embodiments, provision is made for an appropriate control signal demodenx to be supplied on the gate NA6 upon identification of a high degree of modulation on the output signal pausex. This control signal operates the two parallel current sinks N1 and N0 which are connected in series with the current mirror P4. The current mirror P4 is in turn connected in parallel with the current mirror circuits P1 and P2, as a result of which the capacitors' charging current is increased by a multiple. This ensures an unreduced detection bandwidth, since the steady state is restored in accelerated fashion even in the case of a large modulation swing.

To process frequent level changes from, by way of example, "high" to "low" or vice versa, the charging and discharge times of the first charging circuit can advantageously be altered in addition. The effect achieved by this is that the signal profile shown in FIG. 8 can be produced and hence the analog amplitude modulated signal is also digitized for short series of level changes.

The ability to alter the charging and discharge times of the first charging circuit can be achieved, by way of example, by temporarily connecting a capacitance C1' in series with the capacitor C1. This alters the total capacitance of the first charging circuit and hence likewise the charging and discharge times of the first charging circuit.

In this case, the charging and discharge times are altered after each identified point of intersection between the signals Vref and Vsighigh or Vsiglow. This is done by a transistor N11, which shortens the charging and discharge times whenever the signal Vref leaves the voltage window fixed by Vsighigh and Vsiglow and increases the charging and discharge times, or the capacitance, upon re-entry into the voltage window. Hence, the signal profile Vref follows the signal profile of Vsighigh and Vsiglow more quickly. As the changeover point for the useful signal from L to H or from H to L, the first point of intersection S between Vref and Vsighigh and between Vref and Vsiglow is used in each case.

This embodiment comprises the advantage of greater flexibility for the analog/digital conversion in relation to the depth of modulation and the useful signal frequencies. Thus, by way of example, a useful signal frequency of up to 848 kHz can be processed with this exemplary embodiment.

Otherwise, the signals Vref, Vsighigh and Vsiglow are evaluated in a similar manner to in the preceding exemplary embodiments.

The design variables for the circuit can be taken directly from the exemplary embodiment.

The invention is not restricted to this design overall, however.

What is claimed is:

1. A circuit arrangement for analog/digital conversion of a voltage which is ASK modulated by alternating the amplitude between a low and a high level, comprising:
   a rectifier circuit located downstream of a radio-frequency input;
   a first charging circuit and a second charging circuit which are connected in parallel to one another to an output of the rectifier circuit, wherein each of the first and second charging circuits produces a charging voltage;
   a decoupling device which decouples the charging voltages at a prescribed ratio between the respective charging voltages of an input voltage for the rectifier circuit; and
   an evaluation circuit which ascertains a level change from the ratio between the charging voltages,
   wherein the discharge and/or charging time of at least the first charging circuit is shortened when the input voltage is no longer within a voltage window defined by the respective charging voltages, and the discharge and/or charging time of at least the first charging circuit is lengthened when the input voltage is within the voltage window.

2. The circuit arrangement of claim 1, wherein each of the first and second charging circuits has a floating current mirror circuit.

3. The circuit arrangement of claim 1, wherein the first and second charging circuits are coupled to one another via a diode at a predetermined ratio between the charging voltages.

4. The circuit arrangement of claim 1, wherein the voltage from the second charging circuit is converted into two different voltages.

5. The circuit arrangement of claim 1, wherein the first and second charging circuits have different discharge times.

6. The circuit arrangement of claim 1, further comprising a changeover apparatus which turns on a charging current amplification circuit from a prescribed degree of modulation onward.

7. The circuit arrangement of claim 1, wherein the discharge and/or charging time of the first charging circuit is altered based on the ratio between the charging voltages.

8. The circuit arrangement of claim 1, wherein the decoupling device couples the charging voltages when the charging voltage from the second charging circuit falls to a level below the input voltage.

9. A circuit arrangement for analog/digital conversion of a voltage which is ASK modulated by alternating the amplitude between a low and a high level, comprising:
   a rectifier means located downstream of a radio-frequency input;
   a first charging means and a second charging means which are connected in parallel to one another to an output of the rectifier means, wherein each of the first and second charging means produces a charging voltage;
   a decoupling means which decouples the charging voltages at a prescribed ratio between the respective charging voltages of an input voltage for the rectifier means; and
   an evaluation means which ascertains a level change from the ratio between the charging voltages,
   wherein the discharge and/or charging time of at least the first charging circuit is shortened when the input voltage is no longer within a voltage window defined by the respective charging voltages, and the discharge and/or charging time of at least the first charging circuit is lengthened when the input voltage is within the voltage window.

10. The circuit arrangement of claim 9, wherein each of the first and second charging means has a floating current mirror means.

11. The circuit arrangement of claim 9, wherein the first and second charging means are coupled to one another via a diode at a predetermined ratio between the charging voltages.

12. The circuit arrangement of claim 9, wherein the voltage from the second charging means is converted into two different voltages.

13. The circuit arrangement of claim 9, wherein the first and second charging means have different discharge times.

14. The circuit arrangement of claim 9, further comprising a changeover means which turns on a charging current amplification means from a prescribed degree of modulation onward.

15. The circuit arrangement of claim 9, wherein the discharge and/or charging time of the first charging means is altered based on the ratio between the charging voltages.

16. The circuit arrangement of claim 9, wherein the decoupling means couples the charging voltages when the charging voltage from the second charging circuit falls to a level below the input voltage.

17. A method for analog/digital conversion of a voltage which is ASK modulated by alternating the amplitude between a low and a high level, the method comprising the steps of:
   providing a rectifier circuit located downstream of a radio-frequency input;
   providing a first charging circuit and a second charging circuit which are connected in parallel to one another to an output of the rectifier circuit, wherein each of the first and second charging circuits produces a charging voltage;
   decoupling the charging voltages at a prescribed ratio between the respective charging voltages of an input voltage for the rectifier circuit; ai*4 ascertaining a level change from the ratio between the charging voltages;
   decreasing the discharge and/or charging time of at least the first charging circuit when the input voltage is no longer within a voltage window defined by the respective charging voltages; and
   increasing the discharge and/or charging time of at least the first charging circuit is lengthened when the input voltage is within the voltage window.

18. The method of claim 17, further comprising the step of converfing the voltage of the second charging circuit into two different voltages.

19. The method claim 17, further comprising the step of coupling the charging voltages when the charging voltage of the second charging circuit falls to a level below the input voltage.

* * * * *

UNITED STATES PATENT AND TRADEMARK OFFICE
CERTIFICATE OF CORRECTION

| | | |
|---|---|---|
| PATENT NO. | : 7,119,610 B2 | Page 1 of 1 |
| APPLICATION NO. | : 11/104293 | |
| DATED | : October 10, 2006 | |
| INVENTOR(S) | : Albert Missoni | |

It is certified that error appears in the above-identified patent and that said Letters Patent is hereby corrected as shown below:

Column 1, line 45, ""1"" should read --"1s"--;

Column 2, line 46, "voltage. UHF" should read --voltage UHF--; and

Column 3, line 34, ""low"0 to" should read -- "low" to--.

In the Claims, the following errors are corrected:

Claim 17, column 6, line 48,

"voltage for the rectifier circuit; ai*4 ascertaining a level"

should read

--voltage for the rectifier circuit;

ascertaining a level--; and

Claim 18, column 6, line 59, "converfing" should read --converting--.

Signed and Sealed this

Ninth Day of January, 2007

JON W. DUDAS
*Director of the United States Patent and Trademark Office*